United States Patent [19]
Gerhardt

[11] Patent Number: 5,930,901
[45] Date of Patent: Aug. 3, 1999

[54] HAND TOOL AND METHOD FOR CARVING A VEGETABLE INTO A PREDETERMINED SHAPE

[76] Inventor: James P. Gerhardt, 8490 Shermer Rd., Niles, Ill. 60714

[21] Appl. No.: 08/893,029

[22] Filed: Jul. 15, 1997

[51] Int. Cl.⁶ ..................................................... A23P 1/00
[52] U.S. Cl. ................................ 30/310; 30/300; 30/301; 30/316; 30/116
[58] Field of Search .......................... 30/300, 310, 113.1, 30/116, 279.2, 123.5, 279.6, 280, 301, 302, 130; 99/537

[56] References Cited

U.S. PATENT DOCUMENTS

| | | | |
|---|---|---|---|
| 934,840 | 9/1909 | Ross | 30/279.6 |
| 948,573 | 2/1910 | Chase | 30/279.6 |
| 1,182,629 | 5/1916 | Birnbaum | 30/310 |
| 1,390,977 | 9/1921 | Behr | 30/113.1 |
| 1,528,157 | 3/1925 | Leyden | 30/310 |
| 1,530,822 | 3/1925 | Gibson | 30/279.2 |
| 1,614,451 | 1/1927 | Barfield | 99/537 |
| 1,907,582 | 5/1933 | Ray | 30/279.6 |
| 2,549,008 | 4/1951 | Rasaka et al. | 30/116 |
| 2,557,191 | 6/1951 | King | 30/316 |
| 3,384,963 | 5/1968 | Brando | 30/280 |
| 3,747,213 | 7/1973 | Green et al. | 30/279.2 |
| 3,960,218 | 6/1976 | Atchley et al. | 30/310 |
| 4,003,142 | 1/1977 | Morrison et al. | 35/26 |
| 4,456,075 | 6/1984 | Hostetter | 30/310 |
| 4,503,761 | 3/1985 | Cailloux | 99/486 |
| 4,618,003 | 10/1986 | Hostetter | 30/310 |
| 4,979,419 | 12/1990 | Sonkin | 30/113.1 |
| 5,102,678 | 4/1992 | Plant et al. | 426/481 |
| 5,157,836 | 10/1992 | Aulbers et al. | 30/113.1 |

FOREIGN PATENT DOCUMENTS

| | | | |
|---|---|---|---|
| 120215 | 5/1927 | Switzerland | 30/116 |

*Primary Examiner*—Rinaldi I. Rada
*Assistant Examiner*—Stephen Choi
*Attorney, Agent, or Firm*—Baker & McKenzie

[57] ABSTRACT

A hand tool for carving a generally ellipsoid shaped vegetable, such as a potato, turnip, radish or carrot, into a predetermined shape, particularly a mushroom shape, is provided. The hand tool includes a hollow elongated cylinder that has a first end terminating in a circumferential cutting surface, a second end, and an outer surface. At the outer surface of the cylinder between the first and second end of the cylinder, there is attached a wire form. The wire form extends outwardly from the outer surface of the cylinder. A cutting wire is attached to the first end of the cylinder and the end of the wire form furthest from the outer surface of the cylinder. Also disclosed is a method of using the hand tool to carve a generally ellipsoid shaped vegetable into the shape of a mushroom.

13 Claims, 3 Drawing Sheets

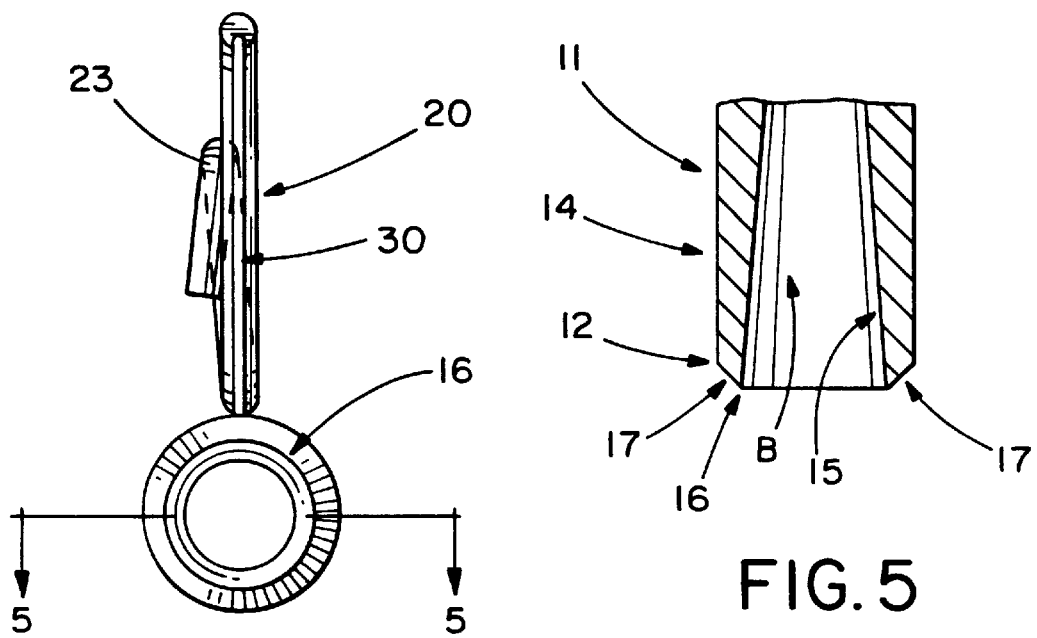
FIG. 4
FIG. 5
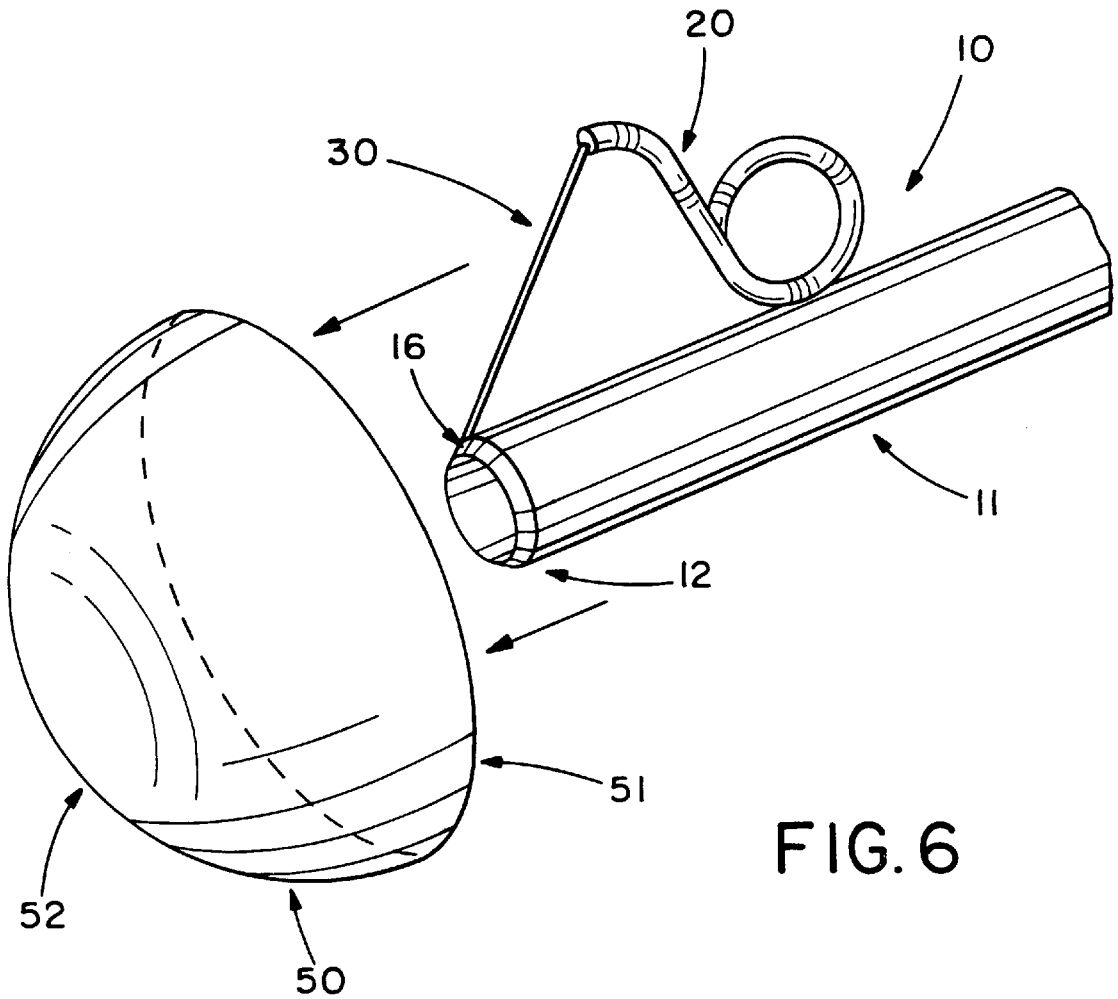
FIG. 6

5,930,901

HAND TOOL AND METHOD FOR CARVING A VEGETABLE INTO A PREDETERMINED SHAPE

BACKGROUND OF THE INVENTION

1. Field of the Invention

This invention relates to a method and a hand tool for carving food produce into shaped configurations. More particularly, the invention relates to a method and a hand tool for the carving a generally ellipsoid shaped vegetable, such as a potato, turnip, radish or carrot, into the shape of a mushroom.

2. Description of the Related Art

It has long been known to hand cut vegetables and fruits into various shaped configurations for decorative purposes. In the culinary art, the term fashioned or sculpted vegetable is usually used to describe a vegetable presented and served to a restaurant patron under a particular geometrical shape. This practice of presenting a particular shaped food product to a patron applies not only to vegetables such as potatoes, carrots and turnips but also to some fruits such as apples and pears.

Generally, the fashioning of vegetables is done by hand wherein a chef uses a knife or other peeling implement to carve the fruit or vegetable in a step-by-step process. It is apparent that the process of forming complex shapes from a vegetable using a knife can be quite a time-consuming process. Therefore, the use of sculpted or fashioned vegetables has generally been limited to expensive restaurants wherein the cost associated with the labor intensive process of fashioning vegetables can be passed on to the restaurant patron in the form of higher prices.

Various mechanical methods have been proposed in the prior art for overcoming the high cost associated with forming fashioned vegetables. For instance, food processors have been used to cut vegetables into various shapes. However, the food processor is generally limited to producing simple shapes such as cubes, strips and rectangular longitudinal shapes such as that used in french fries. Highly automated and mechanized methods of fashioning vegetables have also been proposed. For example, U.S. Pat. No. 5,102,678 discloses a mechanical apparatus that can be applied on an industrial level to produce a high volume of sculpted or fashioned vegetables. U.S. Pat. No. 4,503,761 also discloses a machine that mechanically and rapidly fashions vegetables without manual intervention of the operator on the vegetable. While these mechanical methods for fashioning a vegetable may have found use at produce companies that sell a large volume of product, they are of little use to the restaurant owner or homeowner who desires to have a simple, cost-effective method for producing sculpted or fashioned vegetables.

Therefore, there exists a need in the art for a simple to use and cost-effective hand tool and method for fashioning and sculpting vegetables that allows a user to fashion a vegetable much more quickly and safely than using a knife but at the same time does not require the user to resort to an expensive, highly-mechanized produce-cutting machine.

Accordingly, it is an object of this invention to provide an inexpensive hand tool for carving a vegetable into a predetermined shape that allows a user to fashion a vegetable much more quickly and safely than when using a knife.

It is an additional object of this invention to provide an inexpensive hand tool for carving a vegetable into a predetermined shape that is simple to use and does not require a number of cutting operations to fashion a vegetable.

It is a further object of this invention to provide an inexpensive hand tool for carving a generally ellipsoid shaped vegetable, such as a potato, turnip, radish or carrot, into the shape of a mushroom much more quickly and safely than when using a knife.

It is still another object of this invention to provide a method for carving a vegetable into a predetermined shape that is much quicker and safer than fashioning the vegetable using a knife.

It is a further object of this invention to provide a method for carving a generally ellipsoid shaped vegetable, such as a potato, turnip, radish or carrot, into the shape of a mushroom that is much quicker and safer than fashioning the vegetable using a knife.

SUMMARY OF THE INVENTION

The present invention satisfies the need for a simple to use and inexpensive hand tool for fashioning and sculpting vegetables that allows a user to fashion a vegetable much more quickly than using a knife but at the same time does not require the expense of a highly-mechanized produce-cutting machine by providing a hand tool including a hollow elongated cylinder, a wire form attached to the outer surface of the cylinder and extending outwardly from the cylinder, and a cutting wire secured to an end of the cylinder and to the end portion of the wire form furthest from the cylinder.

The hollow elongated cylinder of the hand tool has a first end that terminates in a circumferential cutting surface, a second end, and an outer surface. The wire form has a first end portion and a second end portion. The second end portion of the wire form is attached to the outer surface of the cylinder at a location between the first and second ends of the cylinder. The wire form extends outwardly from the outer surface of the cylinder generally in the same plane as the axis of the cylinder. The cutting wire also has a first end and a second end. The first end of the cutting wire is attached to the first end of the cylinder and the second end of the cutting wire is attached to the first end portion of the wire form.

The present invention also satisfies the need for a cost effective and uncomplicated method for fashioning and sculpting vegetables that allows a user to fashion a vegetable much more quickly and safely than using a knife by providing a method for carving a generally ellipsoid shaped vegetable into the shape of a mushroom. The method includes the steps of: slicing the vegetable, preferably in half, creating two dome-shaped vegetables; grasping one of the dome-shaped vegetables on the dome-shaped top surface; grasping the hand tool of the present invention near the second end of the tool; placing the circumferential cutting surface of the hand tool in contact with the circular flat bottom surface of the dome-shaped vegetable such that the axis of the cylinder of the hand tool and the centerpoint of the circular flat bottom surface lie substantially in the same line; moving the hand tool a distance toward the dome-shaped surface of the dome-shaped vegetable; rotating the hand tool at least 360 degrees; and pulling the hand tool away from the dome-shaped surface of the dome-shaped vegetable such that the hand tool is completely disengaged from the dome-shaped vegetable. The method of the present invention thereby forms a vegetable in the shape of a mushroom.

It can be appreciated by one skilled in the art that the vegetable to be carved will not have a perfect ellipsoid shape and the term "ellipsoid shaped" is used in this specification to generally define the shape of vegetable to be carved. The term is not intended to limit the invention to a hand tool that carves a vegetable having a shape that perfectly corresponds to the mathematical definition of an ellipsoid. It is apparent that natural products such as a potato do not grow with a perfect ellipsoid surface configuration but have surface imperfections and may have an irregular shape more like an ovoid. Therefore, it is intended that the term "ellipsoid shaped" be interpreted broadly to define a vegetable that has a shape that is similar to an ellipsoid.

BRIEF DESCRIPTION OF THE DRAWINGS

These and other features, aspects, objects, and advantages of the present invention will be become better understood upon consideration of the following detailed description, appended claims and accompanying drawings where:

FIG. 4 shows an end view of the hand tool according to the invention looking down the axis of the hand tool toward the second end of the hollow elongated cylinder of the hand tool;

FIG. 5 shows a sectional view taken along line 5—5 in FIG. 4 showing the tapered inner surface and the beveled cutting edge at the first end of the cylinder;

FIG. 6 depicts a step in the operation of the hand tool according to the invention wherein the hand tool is positioned and moved in the direction of the vegetable to be shaped;

In the Figures, like parts have like numbers. It should also be understood that the drawings may not be to scale and have been included to illustrate a preferred embodiment of the invention.

Description of the Preferred Embodiments

Figure 1:
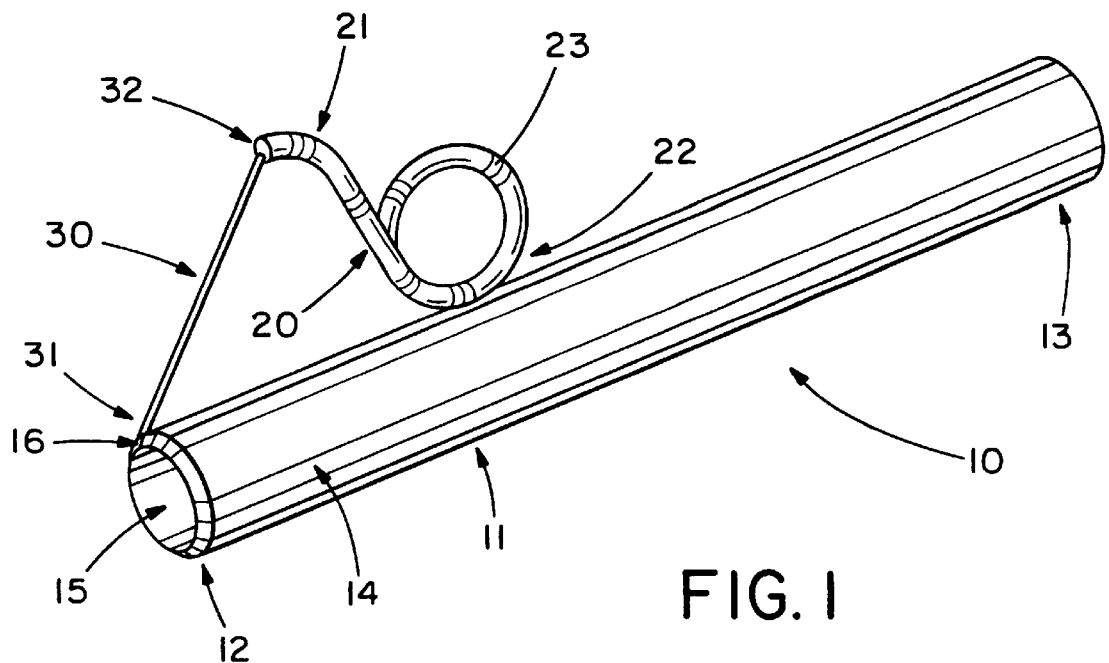
FIG. 1 is perspective view of the hand tool according to the invention for carving a vegetable into a shaped configuration.

With specific reference to the drawings, there is shown in FIGS. 1–4, a hand tool generally designated 10 for carving a vegetable into a predetermined shape. The hand tool 10 includes a hollow elongated cylinder 11 which has a first end 12 terminating in a circumferential cutting surface 16. The circumferential cutting surface 16 is generally perpendicular to the axis of the cylinder 11. The cylinder 11 also has a second end 13, an outer surface 14 and an inner surface 15. The cylinder 11 may be formed from a material suitable for food handling processes such as stainless steel or food grade plastic. The preferred material is stainless steel as it is dishwasher safe and easy to keep free of bacteria.

Figure 2:
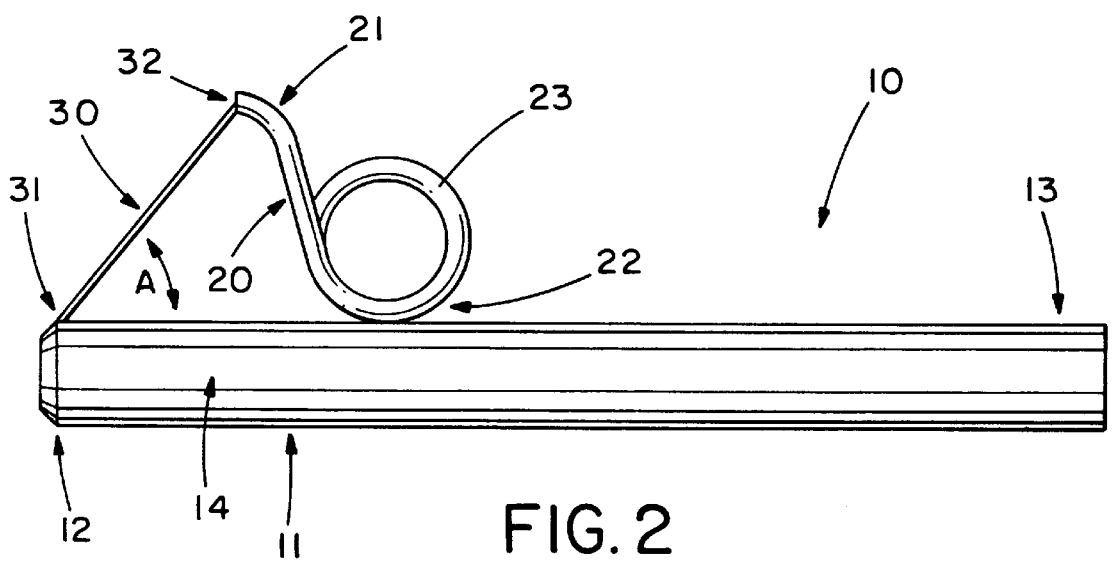
FIG. 2 shows a side view of the hand tool according to the invention.
Figure 3:
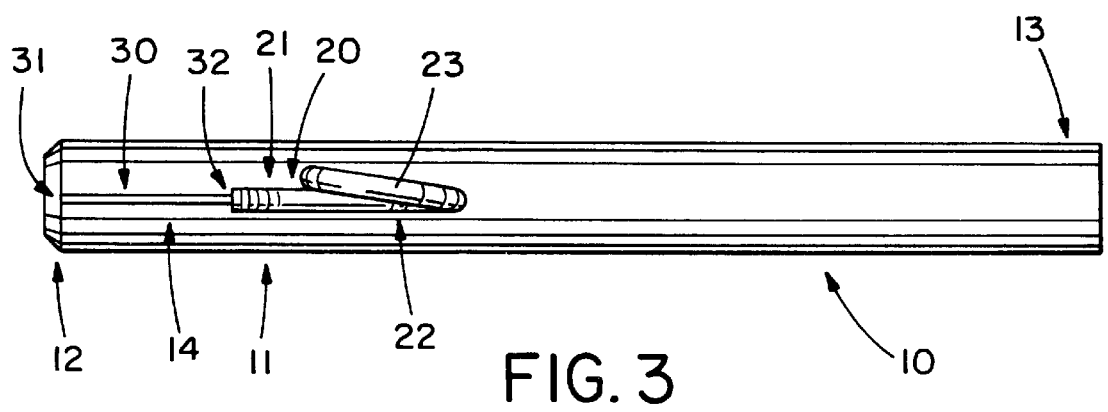
FIG. 3 shows a top view of the hand tool according to the invention.

The hand tool 10 further includes a wire form 20 which has a first end portion 21 and a second end portion 22. In a preferred embodiment of the invention, the second end portion 22 of the wire form 20 comprises a loop 23, which in the embodiment shown is closed to form a circular ring. The loop 23 is configured so that the user of the hand tool 10 may place his or her thumb on the loop 23 and generate a pushing force that enables the hand tool 10 to be twisted more easily when cutting a vegetable. The second end portion 22 of the wire form 20 is attached to the outer surface 14 of the cylinder 11 at a location that is between the first end 12 and the second end 13 of the cylinder 11. The wire form 20 may be fabricated from stainless steel or plastic suitable for food processing use; therefore, the wire form 20 may be attached to the outer surface 14 of the cylinder 11 by suitable processes such as welding or adhesive bonding. The first end portion 21 of the wire form 20 as shown in FIGS. 1–3 is of a curvilinear shape. However, it is contemplated that the first end portion 21 of the wire form 20 may also be of a linear configuration. The cross-section of the wire form 20 may be any of a number of different shapes including round, square, rectangular and hexagonal. The wire form 20 extends outwardly from the outer surface 14 of the cylinder 11 and preferably, extends outwardly from the cylinder substantially in a plane that contains the axis of the cylinder 11. It is also seen from the embodiment of FIGS. 1–3 that the first end portion 21 of the wire form 20 may extend substantially at an acute angle toward the first end 12 of the cylinder 11.

Also shown in the hand tool 10 of FIGS. 1–4, is a cutting wire 30 having a first end 31 and a second end 32. The first end 31 of the cutting wire 30 is attached to the first end 12 of the cylinder 11. The cross-section of the cutting wire 30 may be any of a number of different shapes including round, square, rectangular and hexagonal. Various means of attaching the cutting wire 30 to the first end 12 of the cylinder 11 are contemplated. Generally, the cutting wire 30 will be fabricated from a stainless steel food grade material; therefore, the cutting wire 30 may be spot welded to the first end 12 of the cylinder 11. Depending on the gauge of the cutting wire 30, it may be possible to form a knot in the first end 31 of the cutting wire 30 and pull the first end 31 of the cutting wire 30 through a notch formed in the first end 12 of the cylinder 11 to keep the cutting wire 30 in place. The second end 32 of the cutting wire 30 is attached to the first end portion 21 of the wire form 20. As shown in FIG. 1, wire form 20 is a rigid member with a first maximum cross-sectional dimension having rigidity sufficient to hold second end 32 of cutting wire 30 in a fixed position relative to the cylinder 11, and cutting wire 30 having a second maximum cross-sectional dimension less than the first maximum cross-sectional dimension. Again, it is contemplated that the method of attaching the cutting wire 30 to the wire form 20 may include welding or other suitable processes for bonding stainless steel materials. The cutting wire 30 extends outwardly from the outer surface 14 of the cylinder 11 and preferably, extends outwardly from the cylinder substantially in a plane that contains the axis of the cylinder 11. It can be seen from FIGS. 1 and 2 that the combination of the cylinder 11, the wire form 20, and the cutting wire 30 generally form a triangular shaped configuration. In addition, FIG. 2 shows that an angle "A" is formed between the cutting wire 30 and the outer surface 14 of the cylinder 11. This angle "A" may vary in size in order to produce final products having different shapes. Generally, an acute angle is preferred. Through experimentation it has been determined that an angle of 50 degrees is the most preferred angle for producing a mushroom shape from a potato. Of course, depending on the texture and size of the vegetable, this preferred angle may be varied.

It has been contemplated that the hand tool 10 may include a handle which is secured to the second end 13 of the cylinder 11. However, one skilled in the art would appreciate that the hollow elongated cylinder 11 of the hand tool 10 can be easily gripped by a user, and therefore, the provision of a handle is not a requirement of the hand tool of the present invention.

Referring now to FIG. 5, it can be seen that the inner surface 15 of the cylinder 11 may be tapered from a location near the center of the cylinder 11 to the first end 12 of the cylinder 11. This means that the inside diameter of the hollow elongated cylinder 11 will be greater near the first end 12 of the cylinder 11 than at a position between the first end 12 of the cylinder 11 and the second end 13 of the cylinder 11. The tapering of the inside surface 15 of the cylinder 11 provides a draft angle "B", shown in FIG. 5, that assists in removing the hand tool from a vegetable after the cutting operation is complete. It can also be seen from FIG. 5 that the circumferential cutting surface 16 may have a bevelled edge 17 in order to provide a more efficient cutting operation.

Figure 7:
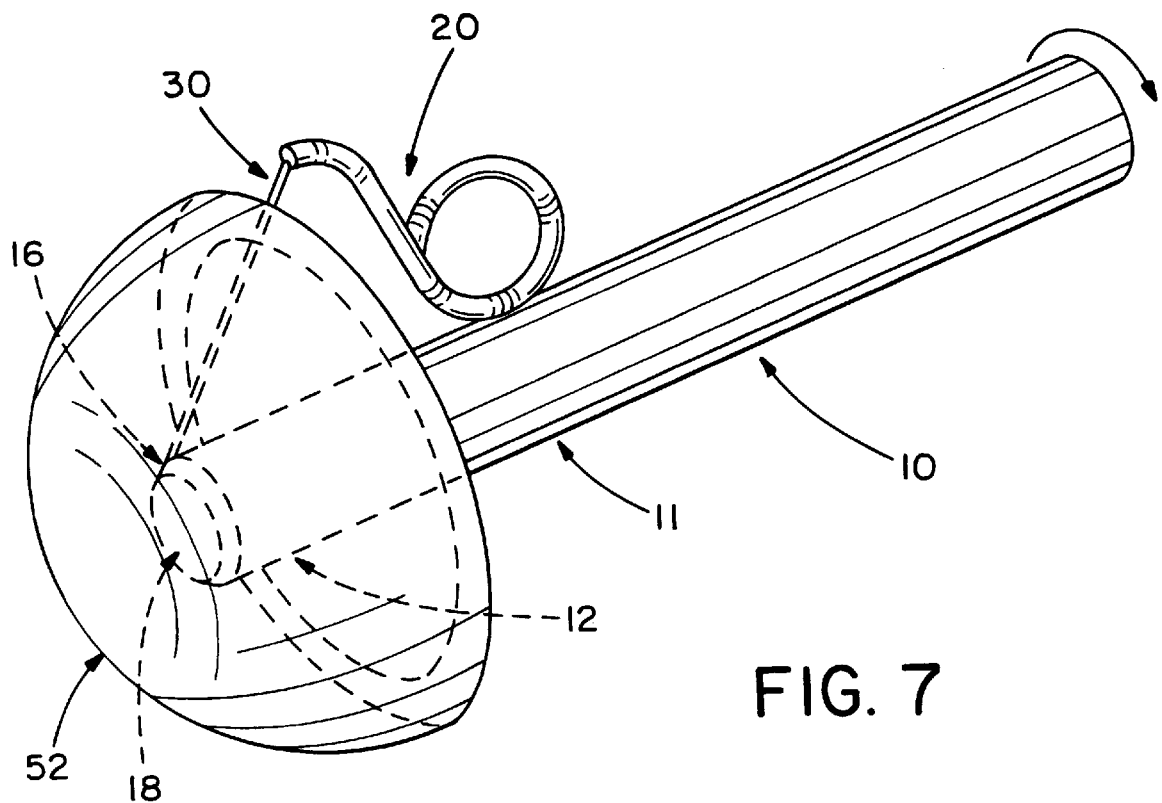
FIG. 7 depicts a step in the operation of the hand tool according to the invention wherein the hand tool is rotated after being inserted into the vegetable.

The method of operation of the hand tool 10 can also be described by reference to the Figures. The method of the invention includes the steps of slicing a generally ellipsoid shaped vegetable, such as along to, turnip, radish or carrot, along a plane generally perpendicular to an axis, preferably the major axis, of the ellipsoid shaped vegetable. After the vegetable is sliced, preferably in half, two dome-shaped vegetables will have been created, each having a generally circular flat bottom surface and a generally dome-shaped top surface. It can be seen from FIG. 6, that one half of the ellipsoid shaped vegetable, generally designated as 50, has a dome-shaped top surface 52 and a circular, flat bottom surface 51, created by slicing the ellipsoid shaped vegetable in half. In the method of the invention, the dome-shaped vegetable 50 is grasped on the dome-shaped top surface 52 and the hand tool 10 is grasped near the second end 13 of the hand tool 10. The hand tool 10 is then moved toward the dome-shaped vegetable 50 as shown in FIG. 6. The dome-shaped vegetable 50 and the hand tool 10 are positioned so that the circumferential cutting surface 16 of the hand tool 10 is in contact with the circular flat bottom surface 51 of the dome-shaped vegetable 50 so that the axis of the cylinder 11 of the hand tool 10 and the centerpoint of the circular flat bottom surface 51 lie substantially in the same line. The hand tool 10 is then moved toward the dome-shaped surface 52 of the dome-shaped vegetable 50. The circumferential cutting surface 16 of the cylinder 11 produces a circular cut in the mass of the dome-shaped vegetable 50 as the hand tool 10 is pushed into the vegetable. As the hand tool 10 is moved deeper into the vegetable 50, the hand tool 10 will be engaged with the vegetable as shown in FIG. 7. The hand tool 10 is only inserted into the dome-shaped vegetable 50 part of the way such that both the circumferential cutting surface 16 of the hand tool 10 and the cutting wire 30 of the hand tool 10 do not pierce the dome-shaped surface 52 of the dome-shaped vegetable 50. After the hand tool 10 has been inserted part of the way into the dome-shaped vegetable 50 as shown in FIG. 7, the hand tool 10 is rotated in a clockwise or counter clockwise direction at least 360° as shown in FIG. 7. When the hand tool 10 is rotated, the cutting wire 30 slices the mass of the dome-shaped vegetable 50. After the hand tool 10 has been rotated at least 360°, the hand tool 10 is pulled away from the dome-shaped surface 52 of the dome-shaped vegetable 50 until the hand tool 10 has been completely disengaged from the dome-shaped vegetable 50.

Figure 8:
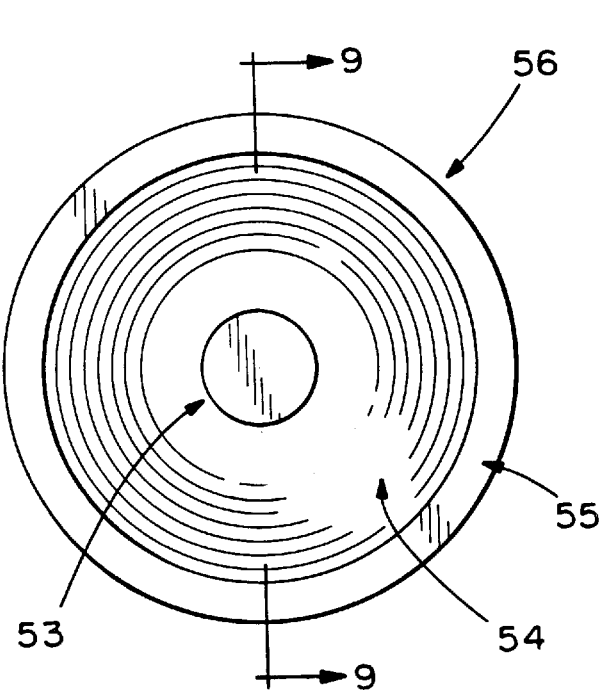
FIG. 8 shows a bottom view of a vegetable shaped using the hand tool according to the invention.
Figure 9:
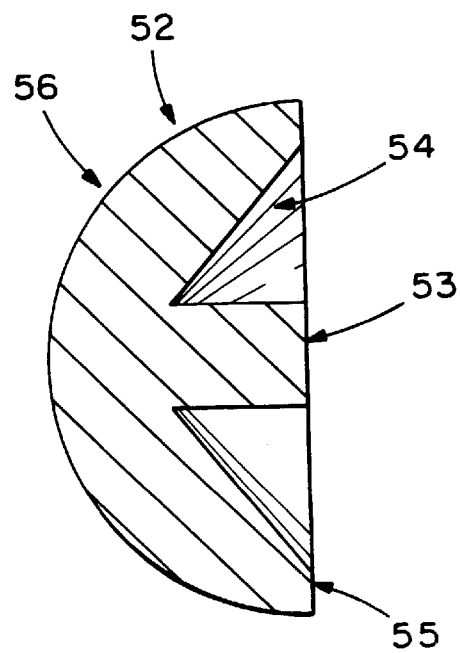
FIG. 9 shows a sectional view taken along line 9—9 in FIG. 8 showing the inner configuration of a vegetable shaped using the hand tool according to the invention.

After the hand tool 10 has been disengaged from the vegetable 50, a fashioned vegetable having the shape shown in FIGS. 8 and 9 remains. It can be seen from FIGS. 8 and 9 that the dome-shaped vegetable 50 of FIG. 6 has been formed into the shape of a mushroom. The mushroom-shaped vegetable 56 has a stem portion 53, which was sculpted by the circumferential cutting surface 16 of the cylinder 11, and an area 54 wherein the vegetable mass has been removed by the cutting action of the cutting wire 30 of the hand tool 10. The dome-shaped top surface 52 of the vegetable remains unaffected by the cutting operation. In addition, a flat bottom surface of the mushroom-shaped vegetable 56 remains unaffected by the cutting operation and is designated as area 55 in FIGS. 8 and 9.

Thus, it is seen that a simple to use and cost-effective hand tool and method for fashioning and sculpting vegetables is provided. The disclosed method and hand tool have advantages over prior art methods and devices as the hand tool allows a user to fashion a vegetable much more quickly and safely than using a knife but at the same time does not require the user to resort to an expensive, highly-mechanized produce-cutting machine. The hand tool of the invention allows a user to quickly produce mushroom shaped fashioned vegetable by slicing an ellipsoid shaped vegetable in half, aligning the hand tool with the flat surface of the vegetable, inserting the hand tool into the vegetable, rotating the hand tool, and pulling the hand tool away from the vegetable, thereby yielding a fashioned vegetable.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A hand tool for carving a vegetable section into a mushroom shape comprising:

a hollow elongated cylinder having a first end, a second end, and a tubular wall having an inner surface and an outer surface, the wall terminating in an annular exposed cutting edge at the first end of the cylinder, a wire form having a first end portion and a second end portion, the second end portion of the wire form being fixedly attached to the cylinder at a location between the first end and the second end of the cylinder, the wire form extending outwardly from the outer surface of the wall of the cylinder substantially in a plane that contains a longitudinal axis of the cylinder; and a cutting wire having a first end and a second end, the first end of the cutting wire being attached to the first end of the cylinder near said cutting edge of said cylinder, and the second end of the cutting wire being attached to the first end portion of the wire form, said wire form being a rigid member with a first maximum cross-sectional dimension, said wire form having rigidity sufficient to hold said second end of said cutting wire in a fixed position relative to said cylinder, and said cutting wire having a second maximum cross-sectional dimension less than first maximum cross-sectional dimension, whereby said cutting wire may cut through said vegetable section when said cutting edge of said cylinder is inserted into said vegetable section and when said cylinder is rotated relative to said vegetable section.

2. The hand tool of claim 1 wherein the second end portion of the wire form comprises a loop.

3. The hand tool of claim 2 wherein a portion of the inner surface of the wall of the cylinder adjacent the first end of the cylinder is tapered toward the outer surface of the wall of the cylinder and the annular cutting surface of the cylinder such that a first inner diameter at the first end of the cylinder is greater than a second inner diameter at a position between the first end of the cylinder and the second end of the cylinder.

4. The hand tool of claim 3 wherein the annular cutting surface is beveled.

5. The hand tool of claim 4 wherein the cylinder, cutting wire and wire form are made from stainless steel.

6. The hand tool of claim 5 wherein an acute angle is formed between the cutting wire and the outer surface of the wall of the cylinder.

7. The hand tool of claim 6 wherein the angle is about 50 degrees.

8. A hand tool for carving a vegetable section into a mushroom shape comprising:

a hollow elongated cylinder having a first end, a second end, and a tubular wall having an inner surface and an outer surface, the wall terminating in an annular cutting edge at the first end of the cylinder;

a wire form having a first end portion and a second end portion, the second end portion of the wire form being fixedly attached to the cylinder at a location between the first end and the second end of the cylinder, the wire form extending outwardly from the outer surface of the wall of the cylinder substantially in a plane that contains a longitudinal axis of the cylinder; and a cutting wire having a first end and a second end, the first end of the cutting wire being attached to the first end of the cylinder and the second end of the cutting wire being attached to the first end portion of the wire form, said wire form being a rigid member with a first maximum cross-sectional dimension, said wire form having rigidity sufficient to hold said second end of said cutting wire in a fixed position relative to said cylinder, and said cutting wire having a second maximum cross-sectional dimension less than first maximum cross-sectional dimension, whereby said cutting wire may cut through said vegetable section when said cutting edge of said cylinder is inserted into said vegetable section and when said cylinder is rotated relative to said vegetable section;

a portion of the inner surface of the wall of the cylinder adjacent the first end of the cylinder being tapered toward the outer surface of the wall of the cylinder and the annular cutting surface of the cylinder such that a first inner diameter at the first end of the cylinder is greater than a second inner diameter at a position between the first end of the cylinder and the second end of the cylinder.

9. The hand tool of claim 8 wherein the second end portion of the wire form comprises a loop.

10. The hand tool of claim 9 wherein the cylinder, cutting wire and wire form are made from stainless steel.

11. The hand tool of claim 10 wherein an acute angle is formed between the cutting wire and the outer surface of the wall of the cylinder.

12. The hand tool of claim 11 wherein the annular cutting surface is beveled.

13. The hand tool of claim 11 wherein the angle is about 50 degrees.

* * * * *